2 Sheets—Sheet 1.

E. F. DUNAWAY
Seed-Planter.

No. 225,275. Patented Mar. 9, 1880.

Witnesses.
A. Ruppert
E. H. Reeves

E. F. Dunaway
Inventor.
D. P. Holloway & Co.
Atty.

E. F. DUNAWAY.
Seed-Planter.

No. 225,275. Patented Mar. 9, 1880.

Witnesses
A. Ruppert,
E. H. Reeves.

E. F. Dunaway,
Inventor.
D. P. Holloway & Co
Atty.

UNITED STATES PATENT OFFICE.

ELIJAH F. DUNAWAY, OF COVINGTON, KENTUCKY.

SEED-PLANTER.

SPECIFICATION forming part of Letters Patent No. 225,275, dated March 9, 1880.

Application filed October 7, 1879.

*To all whom it may concern:*

Be it known that I, ELIJAH F. DUNAWAY, of Covington, Benton county, State of Kentucky, have invented certain new and useful Improvements in Seed-Planters; and I do hereby declare that the following is a full, clear, and exact description thereof, reference being had to the accompanying drawings, and to the letters of reference marked thereon, making a part of this specification—

Figure 1:
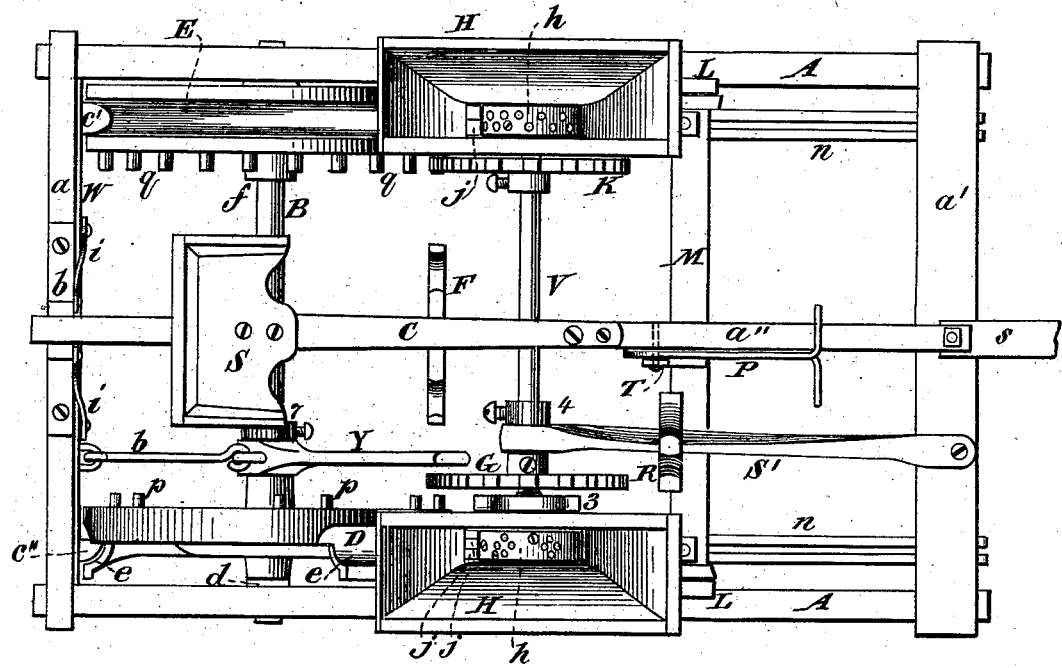
Figure 2:
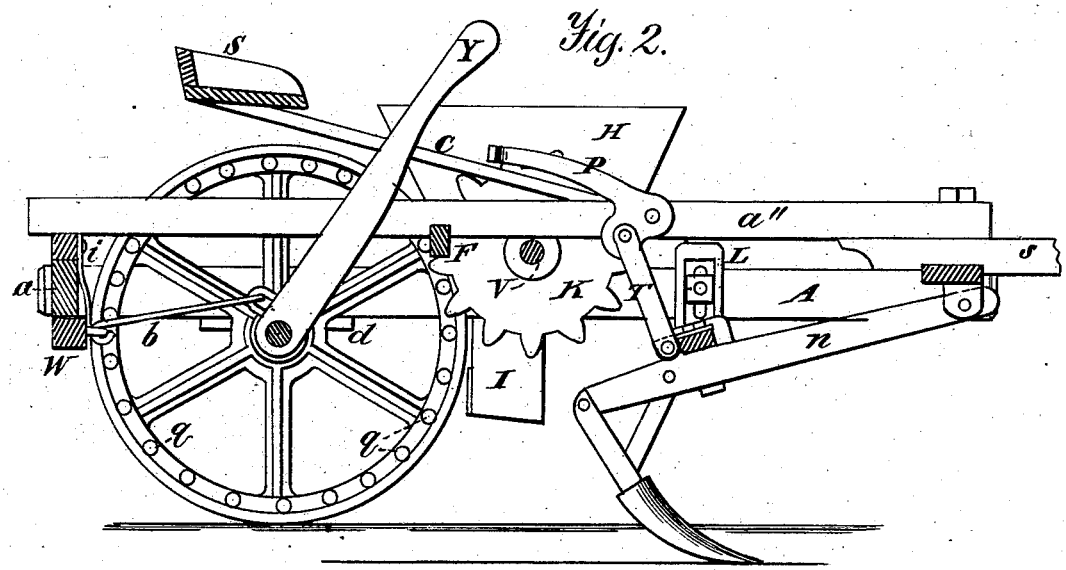
Figure 3:
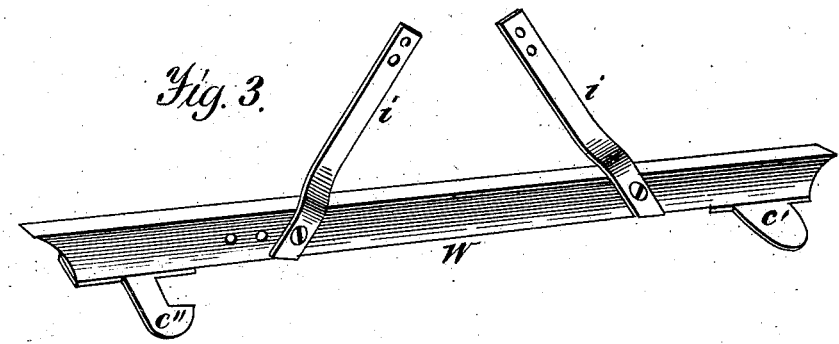
Figure 4:
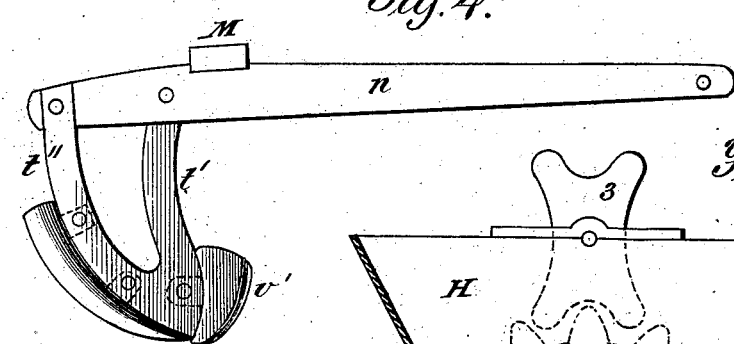
Figure 5:
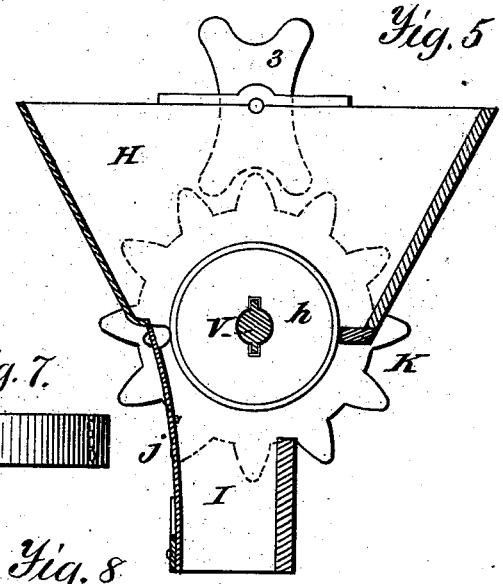
Figure 6:
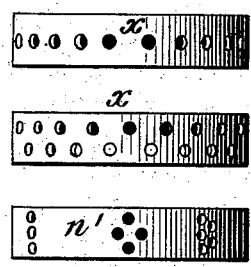
Figure 7:
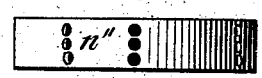
Figure 8:
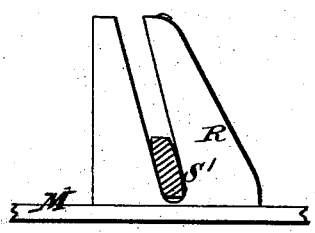

Figure 1 being a plan view of my improved machine. Fig. 2 is a sectional elevation of the same. Fig. 3 is a perspective view of the wheel-scrapers and brake. Fig. 4 is a side elevation of the plow or furrow-former. Fig. 5 is a sectional view, the line passing through one of the seed-hoppers. Fig. 6 is an elevation of the cylindrical plates which contain the seed-pockets. Fig. 7 is a similar view, showing a different arrangement of the pockets; and Fig. 8 is an elevation of an angular guide for throwing the cylindrical plates containing the seed-pockets into and out of gear with the driving-wheels.

Corresponding letters denote like parts in all of the figures.

This invention relates to machines for planting corn and other kinds of seed; and it consists in the novel construction of a driving and seed-covering wheel, which is provided with concave depressions for covering the seed and segmental grooves for connecting the depressions; and, further, in the combination of certain of its parts, as will be more fully stated hereinafter.

In constructing machines of this type I provide a suitable frame, A, upon the rear portion of which a shaft, B, is journaled in boxes $d$, said shaft carrying the driving-wheel D, the side bars of said frame being held in their positions by cross-beams $a\ a'$, as shown in Fig. 1 of the drawings.

The wheel lettered D in the drawings is made to perform the function of aiding in carrying the machine, driving the plates or cylinder in which the seed-pockets are formed, and covering the seeds after they have been dropped in the furrows. To enable it to perform these offices it, as before stated, is mounted upon the shaft B near the side bar or rail of the frame A, and has in its periphery a number of concave recesses, $e$, corresponding in number to the diameter of the wheel, they being at such a distance apart as to adapt them to the covering of the corn or other seeds as they are dropped by the movements of the cylindrical plates, soon to be described. This wheel also distinctly marks the place where the seed has been deposited.

Upon the inside of the wheel D projections $p$ are formed, which are so arranged as to come in contact with a gear-wheel, G, arranged upon the shaft V, which carries the pocketed plates, at such times as to cause the dropping of the seed at the proper intervals and at the requisite distances apart to be covered by the recesses in the wheel.

In order that the recesses in wheel D may be kept free from earth or other substances which would prevent the proper covering of the seeds, there is formed in its outer edge a segmental groove, which extends from one of the recesses to another, into which a scraper, $C''$, is inserted, it being carried upon a beam, W, which extends across the machine and carries upon its opposite end another scraper, $c'$, for a purpose hereinafter described. This beam and its scrapers are suspended from the cross-bar $a$ of the frame by means of springs $i$, which serve to keep the scrapers free from the driving-wheels when not required for cleaning them; but in order that they may be brought in contact with said wheels when necessary, a lever, Y, is made to embrace the shaft B, it turning freely in the lower end of said lever, the upper end of which is near the driver's seat S, so as to be readily operated by the driver or operator. Near the lower end of this lever a staple is inserted in such a manner as to receive the end of a rod, $b$, which extends therefrom to and is connected with the scraper-beam W, so that by changing the position of the upper end of lever Y the scraper may be brought into use.

Upon the side of the machine which is opposite to the one above described there is affixed to shaft B a driving-wheel, E, which has in its periphery a segmental groove extending entirely around it, it being for the purpose of covering seeds when planted in drills or in continuous rolls. This wheel is provided upon its inner surface with a series of pins or projections, arranged at suitable distances apart to cause them to give the required movement to a gear-wheel, K, which is mounted upon the shaft V, which carries the wheel G. This shaft is mounted in bearings attached to the frame A, and is arranged to have a reciprocating as well as a rotating movement, in order that when the machine is used for planting in hills it may be moved into such a position as to cause the wheel G to be operated by the drive-wheel D; but when it is used to plant in drills or continuous rows it may be changed into such a position as to cause the projections upon driving-wheel E to come in contact with gear-wheel K and rotate the shaft V.

It will be observed that when either one of the gear-wheels G or K is being driven by its driving-wheel the opposite one is so far removed from its driver as not to be affected by it, by which means the operator is enabled to change the machine from one for planting in hills to one for planting in drills or continuous rows at pleasure, so that if it is found desirable to plant seeds in alternate rows of hills and drills he can do so without loss of time.

It will be seen by referring to Fig. 1 that scraper C' is arranged to scrape or clean the groove formed in wheel E, and that it is operated at the same time and by the same mechanism as is the one acting upon the wheel D.

In order that provision may be made for carrying the seeds to be planted, hoppers H H are placed over those portions of the shaft U which carry the plates having the seed-pockets, said hoppers being provided with conductors I, which conduct the seed to the furrows formed for their reception. Upon one side of the hoppers or their conductors springs $jj$ are attached in such a manner as to prevent the passage of more than the required number of seed at any one time.

For receiving the seed from the hoppers and passing them into the conductors I in the requisite regulated quantities, there is placed upon the ends of the shaft V cylindrical plates $h\ h$, having in their peripheries pockets varying in number and position, those shown at $x\ x$ being designed for use when planting in drills or continuous rows, and upon that side of the machine upon which is placed the gear-wheel K and drive-wheel E, the pockets therein being placed in rows in order that there may not be any long spaces between the seeds when deposited in the furrow.

At $n'\ n''$ there are shown plates for dropping the seed in hills, one of which plates is shown as having three pockets so arranged as to drop three seeds at one time, it being designed in practice to have a series of plates with different numbers of pockets, so that they may be changed so as to drop the required number of seed in each hill, they being of the size required for different kinds of seeds.

Another plate shows pockets for containing three, four, and five seeds to be dropped in one hill.

For giving to the shaft V and wheels G and K the reciprocating movement above described, there is placed around said shaft one end of an arm, S', the opposite end of which is pivoted to the frame. The inner end of this arm is held in position by being placed between the hub of wheel G and a collar, 4, so that as a longitudinal movement is given to it the shaft V and wheels G and K shall be carried with it.

For giving movement to the arm S', an angular guide, R, is placed on a vertically-moving bar, M, so that as said bar is raised or lowered the angularity of the slot in the guide shall give the required movement to the arm, and thus cause it to shift the position of the shaft and wheels, by which means the machine will be changed from a hill-planting to a continuous row-planting one.

The bar M above alluded to has guides L L at its ends for holding it in position and for allowing it to have imparted to it a vertical movement, it being raised and lowered by means of an eccentric-lever, P, which is pivoted to a bar, $a''$, extending from front to rear of the frame of the machine. From this lever a connecting-link, T, extends downward to a clip secured to the bar M, to which it is attached, so that as the upper end of lever P is moved backward or forward the position of the wheels G and K is changed and the plows or furrowers are raised or lowered.

The plows or furrowers just referred to are provided with beams $n\ n$, which are pivoted to the bar $a'$ of the frame and extend rearward for the required distance, the rear end of the one which is upon that side of the machine which plants the seed in a continuous row having attached to it an ordinary shoe, so constructed as to turn a furrow in both directions, while the one which is upon the opposite side of the machine where the seeds are planted in hills has a plow of peculiar construction. To the beam of this plow two curved bars of iron are secured at different points, they being designated by the letters $t'$ $t''$, said bars being joined at their lower ends, as shown in Fig. 4 of the drawings.

To the forward bar, $t'$, there is secured a sheet, $u'$, of steel or other suitable material, its front edge being curved rearward, in order that if it should come in contact with a stone or other obstruction when the machine is in motion its form will cause it to be raised, which will allow it and the share to which it is connected to rise and pass over the same.

To the rear bar of this plow there is attached a double share for turning a furrow in both directions.

This machine is supplied with a seat, S, spring-bar C, for attaching it to the bar $a''$, and a foot-rest, F, in the usual or any approved manner.

Having thus described my invention, what I claim, and desire to secure by Letters Patent, is—

1. The driving and seed-covering wheel D, it being provided with concave depressions for covering the seeds, segmental grooves for connecting the depressions, and thus allowing them to be kept clean by the use of a scraper, substantially as set forth.

2. The combination of shaft V, wheels G and K, the arm S, and the angular guide R, substantially as set forth, and for the purpose specified.

In testimony whereof I have hereunto subscribed my name this 6th day of September, A. D. 1879.

ELIJAH F. DUNAWAY.

Witnesses:
J. M. MATTHEWS,
J. H. HALLOWELL.